United States Patent [19]

Konischev et al.

[11] Patent Number: 4,612,849
[45] Date of Patent: Sep. 23, 1986

[54] APPARATUS FOR CHAMPAGNIZATION OF WINE IN A CONTINUOUS FLOW

[75] Inventors: Alexandr I. Konischev, Rostov-na-Donu; Vasily P. Arestov, Novocherkassk; Vasily I. Baburin; Ljudmila P. Ilchenko, both of Rostov-na-Donu, all of U.S.S.R.

[73] Assignee: Vserossiisky Nauchnoissledovatelsky Institut Vinogradarstva I Vinodelia Imeni Ya.I. Potapenko, Novacherkassk, U.S.S.R.

[21] Appl. No.: 586,793

[22] Filed: Mar. 6, 1984

[51] Int. Cl.[4] .............................................. C12G 1/02
[52] U.S. Cl. ..................................... 99/277.1; 426/15
[58] Field of Search ............. 99/275, 276, 277, 277.1, 99/277.2, 278, 323.1, 323.2; 426/15

[56] References Cited

U.S. PATENT DOCUMENTS

| 257,489 | 5/1882 | Goewey | 99/277 |
| 3,062,656 | 11/1962 | Agabalianz | 99/277 |
| 3,102,813 | 9/1963 | Shore | 99/278 |
| 3,207,606 | 9/1965 | Williams | 99/276 |
| 3,407,722 | 10/1968 | Huppmann | 99/277.1 |

FOREIGN PATENT DOCUMENTS 198034 8/1967 U.S.S.R. .
687116 9/1979 U.S.S.R. .

Primary Examiner—Robert W. Jenkins
Attorney, Agent, or Firm—Ladas & Parry

[57] ABSTRACT

In accordance with the process of the invention a fermentation mixture is fed to an upper part of a fermentation zone by way of uniform spreading of the mixture throughout the fermentation zone, this being followed by transferring the wine being champagnized to a biogeneration zone by way of uniform spreading of the wine throughout the biogeneration zone with concurrent separation of a liquid sediment in the lower part of this zone. In an apparatus for carrying said process into effect in a reservoir for the fermentation mixture and in a reservoir for biogeneration the lower portions thereof are made conical, said reservoirs accommodating devices for uniform spreading of the liquid throughout the volume thereof. In the reservoir for biogeneration said device is arranged above the conical portion thereof, whereby a zone for sediment accumulation is provided.

5 Claims, 4 Drawing Figures

APPARATUS FOR CHAMPAGNIZATION OF WINE IN A CONTINUOUS FLOW

The present invention relates to the food industry, and more particularly to a process of champagnization of wine in a continuous flow and to an apparatus for carrying such process into effect, which find application in the production of sparkling wines, e.g. of champagne.

Known in the art is a process of manufacturing champagne wines in a continuous flow (cf. USSR Inventor's Certificate No. 687116 of 1979), comprising the steps of preparing and feeding a fermentation mixture, fermentation thereof, biogeneration, ageing the champagnized wine in reservoirs, treating thereof with heat and cold, filtering through packings, adding expedition liqueur, filtering, and bottling. The fermentation process is carried out with the fermentation mixture being fed along a pipeline from above to a fermentation zone at a temperature of 10° to 12° C. Replenishment yeast is additionally fed to the fermentation zone. In this zone the fermentation process and partial biogeneration take place. The resulting product is delivered to a second and final biogeneration stage, which is effected at a temperature of 6° to 8° C. The champagnized wine thus obtained is aged in reservoirs, subjected to heat treatment at 55° C. and cold treatment at minus 5° C., and filtered. Then a required quantity of expedition liqueur is added to the wine, the blend is filtered and bottled.

Said process is carried into effect in an apparatus comprising two series-connected vertical tightened reservoirs, of which the first is intended for fermentation and partial biogeneration and is provided in the upper central portion thereof with a pipe for feeding a fermentation mixture; the second reservoir is intended for secondary fermentation of sugar and biogeneration and is provided in the upper portion thereof with a pipe for discharging the champagnized wine. In both reservoirs packings are arranged; in the first reservoir they are disposed in the lower portion thereof, and in the second reservoir, in the upper portion thereof. The two reservoirs are interconnected by a pipeline built into the central portions of their bottoms. The reservoir for fermentation at ⅓ of its height is fitted with a pipeline for feeding replenishment yeast.

Said process is characterized by a low productivity, insufficiently high quality of the desired product, complicated technology, and an excessively large amount of the process equipment which occupies large areas, requires a sophisticated instrumentation and a highly qualified attendance.

The insufficiently high quality of the target product obtained on such apparatus is caused by that the fermentation mixture is fed to the fermentation stage through the central upper portion of the first reservoir. The fermentation mixture containing 22 g/l of sugar and having a higher specific gravity than the wine being champagnized and found in the first reservoir descends rapidly and overflows to the second reservoir containing a rather considerable amount (7 to 8 g/l) of unfermented sugar; therefore, fermentation goes on in the second reservoir as well, though it is intended exclusively for biogeneration. However, excess unfermented sugar (more than 3 g/l) is found at the outlet from the second reservoir in the already champagnized wine. Moreover, moribund yeast deposits not only on the packings of the both reservoirs, but also on their bottoms and especially in the near-wall space of the packings. Because of the absence of permanent contact of the entire biomass of the yeast with the circulating wine the biogeneration is not only incomplete, but there takes place decomposition of the yeast to primary substances instead of its purposeful autolysis; the resulting primary substances adversely affect the champaign quality.

The removal of the decomposing yeast biomass, washing of the packings and the reservoirs proper require complete shutdown of the apparatus to be performed once or twice a year, to be followed by restarting; as a result, the technological process becomes noticeably prolonged and the servicing of the apparatus appreciably more complicated.

For an adequate purification of champagnized wine additional reservoirs with packings have to be mounted and operated.

In accordance with the prior-art process, the wine materials, the fermentation mixture and the wine being champagnized are subjected to more than twenty process operations, and this brings about improverishment of the wine of biologically active substances, its denaturation, lowering its quality.

It is a specific object of the present invention to simplify the technology of and intensify the process of champagnization of wine.

It is another object of the invention to improve the quality of the product obtained.

It is yet another object to simplify the design of the apparatus for the champagnization of wine in a continuous flow.

Said specific and other objects of the invention are accomplished by that in a process of champagnization of wine in a continuous flow, comprising the steps of preparing, feeding and fermentation of a fermentation mixture, biogeneration of a wine being champagnized with subsequent cooling, clarification, filtering and bottling thereof, according to the invention, the fermentation mixture is fed to an upper part of a fermentation zone by way of a uniform spreading of the mixture over the entire fermentation zone, this being followed by transferring the resulting champagnized wine to a biogeneration zone by way of a uniform spreading thereof over the entire biogeneration zone with a simultaneous separation in the lower part of said zone of a liquid sediment containing tartrates and spent yeast, the biogeneration being carried out concurrently with clarification of the wine being champagnized.

Due to a uniform spreading of the fermentation mixture over the entire fermentation zone, the fermentation process is activated, the formation of stagnation zones is precluded, and a better transfer of all the dead and moribund yeast and tartrates is ensured. No accumulation and decomposition of the yeast occur in the fermentation zone. This considerably extends the fermentation zone and has a favourably effect on the fermentation of sugar.

In the zone of biogeneration, due to a uniform spreading of the wine being champagnized over the entire surface thereof, the yeast biomass is distributed uniformly all over the zone and permanent contact of the wine being champagnized with the autolized yeast is provided, as a result of which the wine is systematically enriched with the required amount of biologically active and surface active substances that produce a particularly beneficent effect on the sparkling characteristics, frothing, bouquet, and taste of the desired product. In addition, biological filtration of the wine takes place at this stage, and this rules out the necessity in an additional operation of clarifying the wine, as well as contributes to preserving the required quantity of surface-active substances and natural bound carbon dioxide gas, the presence of which determines the merits of the manufactured product.

For the manufactured product to contain various desirable quantities of sugar, it is reasonable to introduce additionally expedition liqueur into the clarified champagnized wine by dispersing the former.

For rational use of the main stock materials, utilization of the wastes, and additional enrichment of the wine being champagnized with autolysis products (biologically active and surface-active substances), it is expedient that the separated liquid sediment be periodically withdrawn from the lower part of the biogeneration zone, cooled down to a temperature of $-4°$ to $-6°$ C., subjected to biogeneration for at least three days, whereafter a liquid fraction be isolated from the sediment and recycled to the fermentation stage.

The herein-proposed process of champagnization of wine in continuous flow is carried out in an apparatus comprising two series-connected vertically tightened reservoirs, of which one is intended for fermentation and is provided with a pipe for feeding a fermentation mixture, and the other is intended for biogeneration and is provided with a pipe for introducing wine being champagnized from the first reservoir, packings arranged in the upper part thereof and with a pipe for discharging the champagnized wine, communicating with an accumulating and cooling device, in which apparatus, according to the invention, the pipe for feeding the fermentation mixture and the pipe interconnecting the first and second reservoirs are provided with devices for uniformly spreading the liquid throughout the volume of the reservoirs, whose lower portions are made conical, the device for spreading the liquid in the reservoir for fermentation being arranged in the upper part thereof, and a similar device in the reservoir for biogeneration being arranged above the conical part thereof, whereby a zone for sediment accumulation is provided.

It is expedient that the reservoirs be made of a height 6.5 times exceeding their diameter so as to ensure a difference in the liquid pressure at the inlet and outlet of each reservoir ranging within 0.15 to 0.2 MPa.

In accordance with the invention, the packings in the reservoir for biogeneration are arranged at $\frac{2}{3}$ of its height.

Since in the present apparatus the reservoirs have a smaller diameter and a greater height than in the prior-art apparatus while their volumes are as in the prior-art apparatus, the rate of travel of the wine being champagnized in a continuous flow increases, washing-off of the yeast cells which usually deposit on the inner surface of both reservoirs is intensified, the probability of complete entrainment of all the yeast cells from the fermentation reservoir and their transfer to the biogeneration reservoir becomes higher, and stagnation zones are thus eliminated. Spreading of the fermentation mixture in the upper part of the fermentation reservoir contributes to uniform and complete intermixing of the liquid coming to the fermentation reservoir with the liquid present there; this brings about a considerable increase in the contact area of the liquids being mixed, whereby the fermentation process is intensified, and the fermentation of sugar in the fermentation mixture, whose flow is directed from above, is improved.

As a result, there is no necessity in the provision of a packing in and in feeding replenishment yeast to the first reservoir. The absence of packing in the reservoir together with the absence of sediments in the lower part thereof provide an almost 30% increase in the working fermentation volume, so that it becomes possible to introduce a greater quantity of the fermentation mixture and at the same time each fraction of the wine being champagnized resides in the fermentation state for a longer period of time.

The process of transfer of the yeast cells from the first reservoir to the second one and from the second reservoir to the sediment accumulator is intensified as a result of acceleration of the wine flow in the conically-shaped bottom. The hydrostatic pressure in the lower part of the reservoirs rises considerably, due to an increase in their height and as a result the pressure differential between the points of feeding the fermentation mixture and of delivering the semi-finished product from the first reservoir to the second one is 0.15 to 0.2 MPa. Such an increase in the pressure contributes to the formation of valuable fermentation products and to maximum formation of bound carbon dioxide in the wine, this having a rather favourable effect on the quality of the manufactured product.

Spreading of the liquid coming to the second reservoir above the conical part thereof also contributes to its uniform distribution throughout the volume of this reservoir and creates a zone for the accumulation of sediment.

A uniform distribution of died yeast cells on the packings, separation and accumulation of excess such yeast and of tartrates in the conical lower part of the second reservoir promotes the required enrichment of the wine being champagnized with autolysis products and contributes to systematic preventive maintenance of the apparatus. As a result, the apparatus can be operated without stoppage for 8 to 10 years.

Biological filtration of the champagnized wine, which takes place at the stage of its biogeneration, not only rules out one of the complicated technological operations while preserving a high quality of the manufactured product, but simplifies the apparatus design, its servicing, and brings about a reduction of the working areas.

The invention is further characterized in that in the fermentation reservoir in the middle part thereof a conical perforated dissector is arranged, whose apex looks in a direction opposite to that in which the fermentation mixture moves. This makes it possible to direct the stream of liquid, tending to move over the central portion of the reservoir, to the peripheral portion thereof. As a result, a secondary spreading of the stream and its guicker motion in the peripheral portion occurs, the liquid is better intermixed, stagnation zones are eliminated, and a high quality of the desired product is thus preserved.

An accumulating and cooling device in the apparatus may be provided in an upper portion thereof with a device for feeding and uniform spreading of expedition liqueur.

It is expedient that the apparatus be provided with a device for regenerating the liquid sediment, comprising a unit for accumulating the liquid sediment, provided with a heat jacket and communicating with the conical part of the biogeneration reservoir, and a press filter through which the unit for accumulating the liquid sediment communicates with the fermentation reservoir.

Lysed wines isolated from the sediments are periodically introduced into the fermentation mixture; these wines enrich the wine with biologically active and surface-active substances which improve its sparkling and frothing characteristics, as well as the bouquet and taste of the wine.

Given below is a detailed description of a process of and an apparatus for champagnization of wine in a continuous flow, according to the invention, with reference to the accompanying drawings, in which.

The process of the invention is effected as follows.

A fermentation mixture is prepared by following a conventional procedure. Deoxygenated fermentation mixture is fed to the upper part of a fermentation zone, uniformly spreading the mixture throughout the zone. The fermentation mixture becomes uniformly distributed throughout the zone, actively enters into the fermentation process which is carried out at a temperature of 10° to 12° C. At this stage the processes of yeast accumulation, biogeneration and decomposition are ruled out, and the fermentation zone is considerably extended compared with the prior-art process. The resulting wine being champagnized is transferred from the fermentation zone to a biogeneration zone, also by uniformly spreading the wine throughout the biogeneration zone. In the lower part of this zone, under the inlet for the wine being champagnized, there occurs simultaneous precipitation of tartrates and spent yeast. The resulting liquid sediment, as it accumulates in the lower part of this zone, is periodically withdrawn therefrom for regeneration in an accumulating reservoir, where the sediment is subjected to biogeneration for at least three days at a temperature of −4° to −6° C. Then a liquid fraction (lysed wines) is isolated from it, and this fraction is periodically recycled to the fermentation stage, blending it with the fermentation mixture. The biogeneration process is conducted at a temperature of 6° to 8° C. During this process the wine is biologically filtered, so that additional wine clarification stages are no longer needed. The champagnized and clarified wine is withdrawn from the biogeneration zone for subsequent cold-treatment; as required, the wine is doped with expedition liqueur, and directed to bottling.

Figure 1:
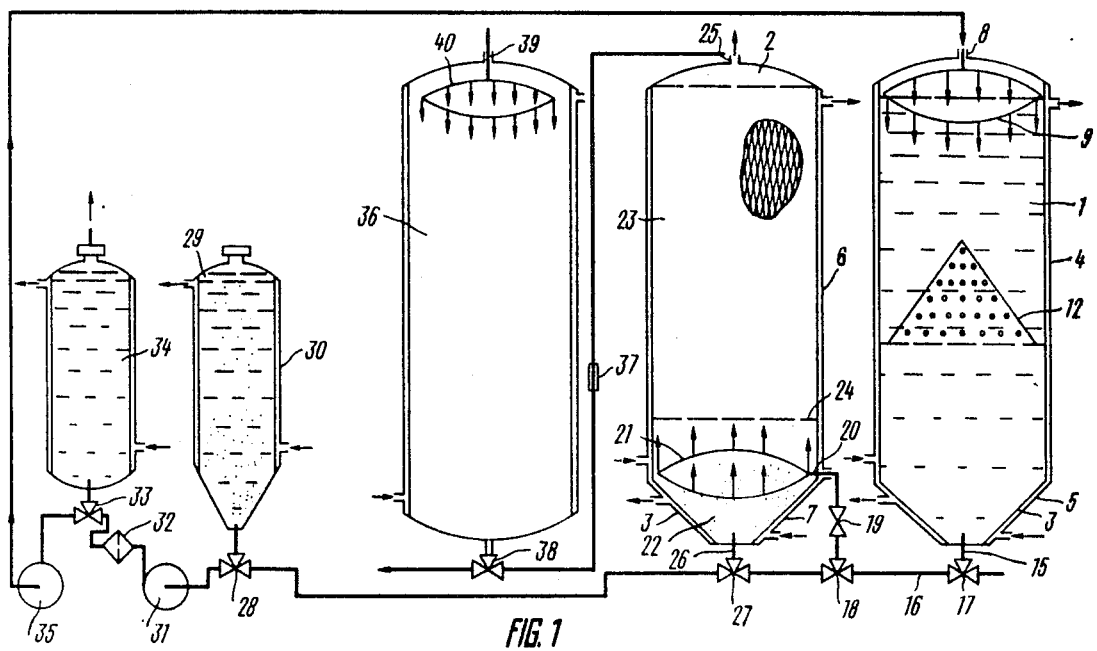
FIG. 1 is a schematic diagram of the apparatus of the invention.
Figure 2:
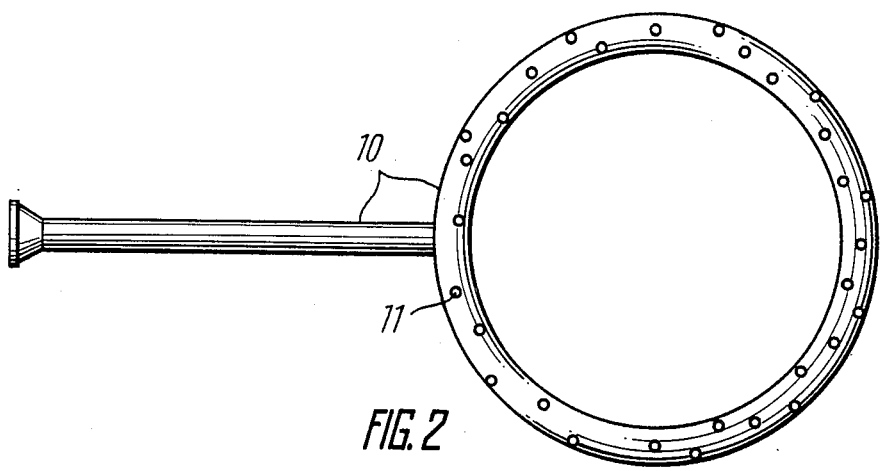
FIG. 2 is an embodiment of a spreading device, bottom view.
Figure 3:
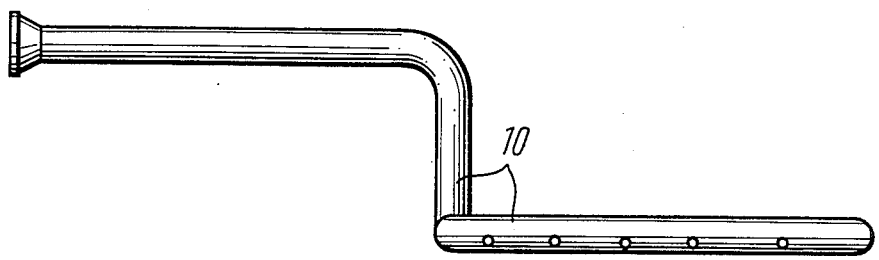
FIG. 3 is the same as in FIG. 2, side view.
Figure 4:
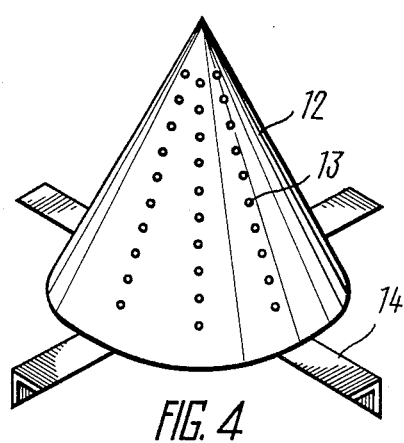
FIG. 4 shows a dissector, three-dimensional presentation.

The process of the invention is carried into effect in an apparatus comprising tightened vertically arranged cylindrical reservoirs 1 and 2 (FIG. 1), whose lower portions 3 are made conical. Each reservoir 1 and 2 has a diameter-to-height ratio of 1:6.5. The reservoirs 1 and 2 are provided with temperature-controlling water jackets 4, 5, 6 and 7 of a conventional design, whose operation is autonomous. The heat carrier in said jackets is water, and it moves through inlet and outlet pipes of the temperature-controlling jackets as shown in FIG. 1 with arrows. In the upper part of the reservoir 1 there is a pipe 8 for introducing the fermentation mixture, said pipe 8 being fitted with a device 9 for a uniform spreading of the liquid throughout the volume of the reservoir 1. The device 9 is fastened inside the reservoir 1 along its longitudinal axis and is made as an annular perforated pipe 10 (FIGS. 2 and 3) with openings 11 whose diameter is 1.5 mm. Arranged inside the reservoir 1 (FIG. 1) at ⅓ of its height is a conical perforated dissector 12 (FIG. 4), which is made hollow and whose openings 13 allow the liquid to pass freely in any direction.

The dissector 12 is made fast in the reservoir 1 by means of brackets 14 in any conventional manner and has its apex looking in a direction opposite to that in which the fermentation mixture moves.

Built into the bottom point of the conical portion 3 of the reservoir 1 (FIG. 1) is an outlet pipe 15, which communicates with an inlet pipe 20 of the reservoir 2 via a pipeline 16 with valves 17, 18, 19. The inlet pipe 20 communicates with a device 21 serving for uniform distribution of the liquid throughout the volume of the reservoir 2, said device 21 being made similar to the device 9 and having openings with a diameter of 3 mm. An increase of the diameter of the openings in device 21 is necessitated by that together with the stream of wine being champagnized from the reservoir 1 there come tartar crystals and died yeast agglomerated into large colonies. The device 21 is arranged inside the reservoir 2 above its conical portion 3 and defines a zone 22 for the accumulation of the sediment.

In the upper portion of the reservoir 2 at ⅔ of the height thereof polyethylene packings 23 are arranged and held in place by means of a perforated grating 24. An outlet pipe 25 of the reservoir 2 is arranged centrally in the upper portion thereof. In the bottom point of conical portion 3 of the reservoir 2 an outlet pipe 26 is built and provided with a sight glass and a three-way valve 27.

The outlet pipe 26 of the reservoir 2 through a valve 28 communicates with a device for regenerating the liquid sediment, which comprises an accumulator 29 provided with a temperature-controlling jacket 30 for setting up a temperature of −4° to −6° C. in it, and having a conical bottom.

The accumulator 29 communicates with the inlet pipe 8 of the reservoir 1 through a pump 31, a filter press 32, a valve 33, a tightened reservoir 34, and a pump 35.

By means of the outlet pipe 25 the reservoir 2 communicates with an accumulator-and-cooler 36 of champagnized wine through a rotameter 37 and a three-way valve 38.

After filling the accumulator-and-cooler 36 with champagnized wine to the designated limits, expedition liqueur is introduced into the wine, as required, through a pipe 39 and a spreading device 40.

Further treatment and bottling are carried out in accordance with the adopted technology.

It goes without saying that the present apparatus, like all others, is equipped with all the necessary devices and instruments conventionally employed for carrying out visual observations, controlling the technological process under prescribed conditions, and automating the entire process.

The present apparatus operates as follows.

The reservoirs 1 and 2 are filled with carbon dioxide gas to a minimum pressure of 0.02 MPa, then, through the outlet pipe 15 and valves 17, 18, 19 and through the outlet pipe 26 the reservoirs 1 and 2 are filled with a deoxygenated fermentation mixture prepared in accordance with a conventional process flow sheet. In so doing, a gas chamber is left, which must be within 1% of the capacity of the reservoirs. 15 days after filling the reservoirs with the fermentation mixture the operation of the apparatus is switched over to a continuous-flow mode.

The deoxygenated fermentation mixture is continuously fed to the reservoir 1 through the pipe 8 and device 9. The fermentation mixture in the reservoir 1 and the champagnized wine in the reservoir 2, displacing the carbon dioxide gas together with the champagnized wine through the pipe 25, fills the gas chambers left in the both reservoirs. Spreading over the entire inner surface of the reservoir 1, the fermentation mixture becomes uniformly distributed and actively enters in the fermentation process which is effected at a temperature of 10° to 20° C.

Since such liquid, while moving within the cylindrical part of reservoir 1, tends to travel over the centre, it gets on the conical dissector 12, which again directs the liquid to the peripheral portion of the reservoir. Therefore, there occurs secondary spreading of the stream of the wine being champagnized, while its accelerated motion at the peripheral portion precludes the formation of stagnation zones and ensures a better transfer of all the died-off or moribund yeast and tartrates in the reservoir 2. The accelerated motion of the wine stream at the peripheral portion of the reservoir contributes to the displacement of some part of the wine from under the dissector 12 through its openings to the upper portion of the reservoir. As a result, countercurrent conditions are created for the medium, and the biochemical fermentation processes are thereby intensified.

Furthermore, the process of entraining the died-off or moribund yeast and tartrates from the reservoir 1 is enhanced due to the conical shape of the bottom of reservoir 1, since such shape ensures a uniform increase of the stream rate to that of its inlet. Washing the walls of the conical bottom, the stream with an increasing rate which precludes precipitation of the yeast and tartrates entrains them and brings them out through the outlet pipe 15.

From the reservoir 1 the wine being champagnized is transferred in a continuous flow to the reservoir 2 through the pipeline 16, valves 17, 18, 19, inlet pipe 20, and the device 21. The champagnized wine and part of the yeast are uniformly spread over the inner surface of the reservoir 2 and ascend.

Since no yeast accumulation, biogeneration or decomposition occurs in the reservoir 1, while in the reservoir 2 the wine stream gets into the intermediate space between the precipitating, accumulating and autolyzing yeast in the lower conical portion (i.e. in the accumulation zone 22) and on the packings 23 located in the upper part of the reservoir 2, the fermentation zone in the reservoir 1 is considerably extended (by as much as 30% over the prior art process). This is particularly favourable for the fermentation of sugar. At the same time, in virtue of a rational dispersal of a large mass of died-off yeast, the process of autolysis in the reservoir 2 is more thorough. Passing through the packings 23, the yeast is hindered by them and precipitates on them in a uniform layer to undergo biogeneration. The wine being champagnized, continually passing through the packings and contacting the yeast biomass, is systematically enriched with the products of biogeneration (biologically active and surface-active substances). At the same time a large layer of the packing and yeast biomass promotes biological filtration of the wine. The process of the wine biogeneration in the upper cylindrical portion of the reservoir 2 is carried out at a temperature of 7° C.

The champagnized and clarified wine is discharged from the reservoir 2 through the pipe 25 into the accumulator-and-cooler 36, where the wine is subjected to subsequent cold-treatment, is dosed with expedition liqueur, filtered, and directed to bottling. The process of champagnization of each wine fraction, from feeding the fermentation mixture to the reservoir 1 to discharging the champagnized wine from the reservoir 2, takes 15 days.

Periodically, as the liquid deposit accumulates in the conical portion of the reservoir 2, without interrupting the champagnization flow, the direction of the stream in the reservoir 2 is changed towards the lower portion of the reservoir, by shutting off the upper outlet pipe 25 and opening the valve 27 that connects the outlet pipe 26 with the tightened accumulator 29, in which the pressure of carbon dioxide gas is maintained 0.25 MPa lower than in the bottom point of the reservoir 2. The pressure difference and the conical shape of the bottom ensure a uniform increase of the stream rate to that of its inlet. The stream, entraining the sediments from the conical bottom, which contain died-off yeast and tartrates, brings them out to the accumulator 29. Withdrawal of the sediments from the reservoir 2 is stopped by shutting off the valve 27 and opening the pipe 25 for discharging the champagnized wine from the reservoir 2.

The sediments collected in the accumulator 29 are kept at $-4°$ to $-6°$ C. for at least three days for a better extraction of biogeneration products from the yeast. Then the sediments with the aid of the pump 31 are passed through the filter press 32 to extract lysed wine therefrom, this wine being quite rich in autolysis products. The extracted lysed wine is fed to the tightened reservoir 34, where the wine is stored at a temperature of $-4°$ to $-6°$ C. and under the pressure of 0.3 MPa.

The lysed wine is periodically introduced into the fermentation mixture and fed through the pipe 8 to the reservior 1 for fermentation.

The present invention will be better understood from a description of a specific embodiment of the present process of champagnization of wine in a continuous flow, given hereinbelow by way of example.

EXAMPLE

A deoxygenated fermentation mixture prepared by following a conventional procedure, containing 22 g/l of sugar and 5 to 8 mln/ml of viable yeast cells is continuously fed to a reservoir 1 having a total capacity of 5,000 dal and a height of 15 m through a pipe 8 and a spreading device 9. The uniformly disseminated fermentation mixture actively enters into the fermentation process which proceeds at a temperature of 10° to 12° C. As the stream of wine being champagnized moves downwards, a dissector 12 directs it to the peripheral portion of the reservoir 1, and then, due to a hydrostatic pressure difference within 0.005 MPa, the wine is transferred to the reservoir 2, whose dimensions are similar to those of the reservoir 1, through a pipe 15, a pipeline 16, valves 17, 18, 19, and inlet pipe 20, and a spreading device 21, whose openings are equal to 3 mm.

Crystallized tartrates and a part of died-off and agglomerated yeast precipitate and accumulate in the conical part of the reservoir 2, making up sediment; the other part of the died-off and depressed yeast together with the wine being champagnized is directed to packings 23, where the yeast precipitates and undergoes autolysis.

Periodically, once every 1 or 2 months, the accumulated sediment through an outlet pipe 26 and valves 27, 28 is transferred to an accumulator 29, cooled down to −4° to −6° C., and kept at such temperature and under the pressure of 0.3 MPa for at least 3 days. Then the sediment from the accumulator 29 through the valve 28 by means of a pump 31 is passed through a filter press 32. The resulting lysed wine is transferred through the valve 33 into a reservoir 34, and then periodically by means of a pump 35 through the valve 33 the lysed wine is blended with the fermentation mixture in a ratio of 0.001:2 and directed through the pipe 8 to fermentation.

The wine being champagnized, enriched with autolysis products on the packings 23, while passing through the 10-meter height of the packings and through the yeast biomass, undergoes biological clarification. In exceptional cases, examination of clarified champagnized wine under a microscope, after centrifugation of 10 ml of wine, reveals one dead decomposing yeast cell in the field of vision of the instrument.

From the reservoir 2 the champagnized wine through a pipe 25, a rotameter 37 and a valve 38 is directed to an accumulator-and-cooler 36, whose dimensions are similar to those of the reservoirs 1, 2; the wine is cooled down to −3° to −4° C. and added with 30 g/l of sugar in the form of 70% expedition liqueur aged for 6 months, to the quality of dry champagne. Said liqueur is introduced through a pipe 39 and a spreading device 40. After 2 days of ageing the wine cooled down to −3° to −4° C. is directed to filtration and bottling. The quality of the wine thus manufactured considerably excels that of the wine produced by the prior-art process. Comparative data on the physicochemical and chemical characteristics of the champagne as manufactured by the present and prior-art processes, are tabulated hereinbelow.

| Characteristics | Unit of measurement | Prior-art process | Present process |
|---|---|---|---|
| 1. Residual content of sugar | g/l | 3.5 | 2.3 |
| 2. Aldehydes | mg/l | 95 | 80 |
| 3. Nitrogen of amines | mg/l | 148 | 167 |
| 4. Stability of two-sided film | s | 7.0 | 7.2 |
| 5. Resistance of wine to $CO_2$ evolution | K | 1.29 | 1.38 |
| 6. Redox potential | mV | 205 | 195 |
| 7. Total number of yeast cells in the field of vision of microscope after centrifugation of 10 ml of wine | thousand cells | 220 | sometimes 1 in deformed state |

What is claimed is:

1. An apparatus for champagnization of wine in a continuous flow, comprising: a vertical tightened reservoir for fermentation, a lower portion thereof is conical; a pipe for feeding a fermentation mixture to said reservoir; a pipe for discharging wine being champagnized from said first reservoir, arranged in a lower part thereof; a second vertical tightened reservoir for biogeneration communicating with said first reservoir, a lower power whereof is conical; temperature-controlling jackets for each reservoir; a pipe for introducing the wine being champagnized from said first reservoir into said second reservoir; packings arranged in an upper part of said second reservoir at a height of about ⅔ of said second reservoir; an outlet pipe for discharging champagnized wine from said second reservoir; an accumulator-and-cooler communicating with said outlet pipe of said second reservoir; a device for uniform spreading of liquid throughout the volume of said first reservoir, arranged on said inlet pipe of said reservoir in an upper part thereof; a device for uniform spreading of liquid throughout the volume of said second reservoir, arranged on said inlet pipe of said second reservoir above said conical lower portion thereof, wherein in said lower conical portion of said second reservoir a zone for sediment accumulation is provided, said devices for uniform spreading of liquid comprising perforated pipes extending along a perimeter of each of said reservoirs.

2. An apparatus as claimed in claim 1, wherein said reservoirs have a height 6.5 times exceeding their diameter and ensuring a difference in the pressure of liquid at the inlet and outlet of each reservoir of 0.15 to 0.2 MPa.

3. An apparatus as claimed in claim 1, wherein a conical perforated dissector is provided in said reservoir for fermentation, said dissector having its apex directed opposite to the direction in which the fermentation mixture moves.

4. An apparatus as claimed in claim 1, wherein said accumulator-and-cooler in its upper portion is provided with a device for feeding and uniformly spreading expedition liqueur.

5. An apparatus as claimed in claim 1, wherein a device is provided for the regeneration of liquid sediment, comprising: an accumulator of liquid sediment, fitted with a temperature-controlling jacket and communicating with the conical portion of said reservoir for biogeneration; a press filter through which said accumulator communicates with said reservoir for fermentation.

* * * * *